(12) United States Patent
Kristen et al.

(10) Patent No.: US 6,444,764 B1
(45) Date of Patent: Sep. 3, 2002

(54) SUPPORTED CATALYST SYSTEM FOR POLYMERIZING ALK-1-ENES

(75) Inventors: Marc Oliver Kristen, Limburgerhof; David Fischer, Breunigweiler, both of (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 09/380,712

(22) PCT Filed: Feb. 18, 1998

(86) PCT No.: PCT/EP98/00929

§ 371 (c)(1),
(2), (4) Date: Sep. 8, 1999

(87) PCT Pub. No.: WO98/40418

PCT Pub. Date: Sep. 17, 1998

(30) Foreign Application Priority Data

Mar. 11, 1997  (DE) .......................................... 197 09 866

(51) Int. Cl.⁷ .................................................. C08F 4/06
(52) U.S. Cl. ...................... 526/131; 526/133; 526/126; 526/160; 526/943; 502/103; 502/152; 502/202
(58) Field of Search ................................ 502/103, 152, 502/202; 526/131, 133, 126, 160, 943

(56) References Cited

U.S. PATENT DOCUMENTS

| | | | |
|---|---|---|---|
| 4,794,096 A | | 12/1988 | Ewen |
| 5,001,244 A | | 3/1991 | Welborn |
| 5,391,793 A | | 2/1995 | Marks et al. |
| 5,411,925 A | * | 5/1995 | Geerts et al. ............... 502/117 |
| 5,414,180 A | | 5/1995 | Geerts et al. |
| 5,449,650 A | | 9/1995 | Sugano et al. |
| 5,480,848 A | | 1/1996 | Geerts et al. |
| 5,534,473 A | | 7/1996 | Welch et al. |
| 5,885,924 A | * | 3/1999 | Ward ........................ 502/402 |

FOREIGN PATENT DOCUMENTS

| | | |
|---|---|---|
| DE | 43 44 672 | 6/1995 |
| EP | 206 794 | 12/1986 |
| EP | 250 600 | 1/1988 |
| EP | 284 708 | 10/1988 |
| EP | 612 753 | 8/1994 |
| EP | 621 279 | 10/1994 |
| EP | 630 900 | 12/1994 |
| EP | 633 264 | 1/1995 |
| EP | 683 179 | 11/1995 |
| WO | 92/01005 | 1/1992 |
| WO | 93/16116 | 8/1993 |
| WO | WO 93/16116 * | 8/1993 |
| WO | 95/07939 | 3/1995 |

OTHER PUBLICATIONS

J. of Organometallic Chem. 369 (1989) 359–370, Wiesenfeldt et al.

\* cited by examiner

*Primary Examiner*—David W. Wu
*Assistant Examiner*—Ling-Siu Choi
(74) *Attorney, Agent, or Firm*—Keil & Weinkauf

(57) ABSTRACT

A catalyst system for polymorization of $C_2$–$C_{12}$-alk-1-eres, comprising

A) an organic or inorganic support,
B) at least one metallocene complex,
C) oligomeric aluminum oxide compounds and
D) at least one boron compound of the formula I

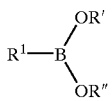

I or a cyclic boron compound of the formula II

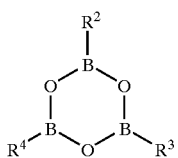

II or mixtures of boron compounds I and II.

19 Claims, No Drawings

SUPPORTED CATALYST SYSTEM FOR POLYMERIZING ALK-1-ENES

The present invention relates to a catalyst system for polymerizing $C_2$–$C_{12}$-alk-1-enes which comprises A) an organic or inorganic support,
B) at least one metallocene complex,
C) oligomeric aluminum oxide compounds and
D) at least one boron compound of the formula I

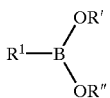

I or a cyclic boron compound of the formula II

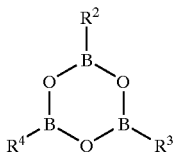

II or mixtures of boron compounds I and II,
where, in the formulae I and II, the substituents have the following meanings:

$R^1$ to $R^4$ are each a $C_1$–$C_{20}$-alkyl group which may bear halogen atoms, $C_6$–$C_{15}$-aryl groups and/or $C_1$–$C_{10}$-alkoxy groups as substituents, a $C_4$–$C_7$-cycloalkyl group which may bear halogen atoms, $C_1$–$C_{10}$-alkyl groups and/or $C_1$–$C_{10}$-alkoxy groups as substituents, a $C_1$–$C_{10}$-alkoxy or alkyl sulfide group which may bear halogen atoms, $C_1$–$C_{10}$-alkyl groups and/or $C_6$–$C_{15}$-aryl groups as substituents, a $C_6$–$C_{15}$-aryl group which may bear halogen atoms, $C_1$–$C_{10}$-alkyl groups, $C_1$–$C_{10}$-haloalkyl groups, $C_4$–$C_{10}$-cycloalkyl groups, $C_6$–$C_{15}$-aryl groups, $C_1$–$C_{10}$-alkenyl groups, amino groups, monoalkylamino or dialkylamino groups, nitro groups, formyl groups, acetamido groups and/or $C_1$–$C_{10}$-alkoxy groups as substituents or a $C_3$–$C_{15}$-heterocycle which contains from one to three oxygen, sulfur and/or nitrogen atoms in the ring system and may bear halogen atoms, $C_1$–$C_{10}$-alkyl groups and/or $C_6$–$C_{15}$-aryl groups as substituents, furthermore, $R^1$ to $R^4$ are as defined above and additionally bear from one to three further B(OR')(OR") groups or, if $R^1$ to $R^4$ contain an aromatic ring, this is part of a metallocene system, R' and R" are identical or different and are each hydrogen or a $C_1$–$C_{10}$-alkyl group.

The present invention further relates to a process for preparing such catalyst systems, the use of such catalyst systems for preparing polymers of $C_2$–$C_{12}$-alk-1-enes, a process for preparing the polymers with the aid of these catalyst systems, the polymers obtainable in this way and their use for producing films, fibers and moldings.

To be able to use metallocene catalysts for the polymerization of alk-1-enes in suspension or gas-phase processes, they have to be in supported form. Methods of applying metallocenes which are activated with oligomeric aluminum oxide compounds such as methylaluminoxane (MAO) to supports are described, for example, in EP-A 206 794, EP-A 250 600 and WO 95/07939.

Supported catalyst systems which are obtained in this way can be used in suspension (DE-A 43 44 672) or gas-phase processes (EP-A 323 716). However, in order to ensure high productivities, these catalyst systems have a very high content of expensive methylaluminoxane. Apart from this economic disadvantage, high methylaluminoxane contents lead to high contents of aluminum residues in the polymer products, which can have an adverse effect during processing or necessitate complicated steps to purify the polymer.

WO 93/16116 describes the use of cyclic boron-oxygen compounds as an additive in the solution polymerization of propylene. The addition of these compounds enables the activity of the metallocene/MAO catalyst system to be tripled.

The preparation of a solid cocatalyst by reacting an aluminoxane compound and a boroxane is described in EP-A 612 753 and U.S. Pat. No. 5,411,925. U.S. Pat. No. 5,480,848 teaches the preparation of a similar solid cocatalyst by reacting an aluminoxane with an organoboron compound which has no acidic H atom. Boroxane-containing cocatalysts are also described in EP-A 683 179. Furthermore, boronic acids can also be used for preparing analogous cocatalysts (U.S. Pat. Nos. 5,414,180 and 5,449,650).

However, these documents provide no information about polymerization using catalyst systems which are supported on an inert material. The properties of supported catalyst systems nevertheless very frequently deviate from those of systems in solution, as is known to those skilled in the art. It is precisely this behavior which enables the morphology of the polymer produced to be set exactly by selection of a suitable support material, which represents a great advantage when using these catalyst systems in particle forming processes such as suspension and gas-phase processes.

It is an object of the present invention to develop a catalyst system supported on an inert material for polymerizing alk-1-enes which has a high productivity, causes no reactor fouling, i.e. no deposits on stirrer and reactor walls, and gives polymers having a good morphology.

We have found that this object is achieved by the catalyst system defined in the introduction for preparing polymers of $C_2$–$C_{12}$-alk-1-enes. We have also found a process for its preparation, the use of such catalyst systems for preparing polymers of $C_2$–$C_{12}$-alk-1-enes, a process for preparing polymers with the aid of these catalyst systems, the polymers obtainable in this way and their use for producing films, fibers and moldings.

The catalyst system of the present invention comprises an organic or inorganic support as component A). Support materials used are preferably finely divided supports which have a particle diameter in the range from 0.1 to 1000 μm, preferably from 10 to 300 μm, in particular from 30 to 70 μm. Suitable organic supports are, for example, finely divided polymers, e.g. finely divided polyethylene or finely divided polypropylene. Suitable inorganic supports are, for example, aluminum oxide, silicon dioxide, titanium dioxide or their mixed oxides, aluminum phosphate or magnesium chloride. Preference is given to using silica gels of the formula $SiO_2 \cdot a\, Al_2O_3$ where a is from 0 to 2, preferably from 0 to 0.5. The support particles can be used in granulated form or spray-dried in microscopic form. Such products are commercially available, e.g. silica gel 332 from Grace or ES 70 X from Crosfield.

The amount of support, i.e. of component A), is preferably from 50 to 99.9% by weight based on metallocene complex, i.e. on component B).

As component B), the catalyst system of the present invention comprises one or more metallocene complexes. Particularly useful metallocene complexes are those of the formula III

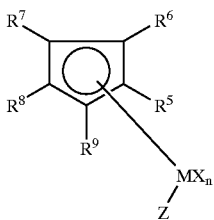

III where the substituents have the following meanings:

M is titanium, zirconium, hafnium, vanadium, niobium or tantalum, or an element of transition group III of the Periodic Table or the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{10}$ or —$NR^{10}R^{11}$, n is 1, 2 or 3, where n corresponds to the valence of M minus 2, where $R^{10}$ and $R^{11}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^5$ to $R^9$ are hydrogen, $C_1$–$C_{10}$-alkyl, 5- to 7-membered cycloalkyl which in turn may bear $C_1$–$C_{10}$-alkyl as substituents, $C_6$–$C_{15}$-aryl or arylalkyl, where two adjacent radicals may also together form a saturated or unsaturated cyclic group having from 4 to 15 carbon atoms, or $Si(R^{12})_3$ where $R^{12}$ can be $C_1$–$C_{10}$-alkyl, $C_3$–$C_{10}$-cycloalkyl or $C_6$–$C_{15}$-aryl and Z is X or 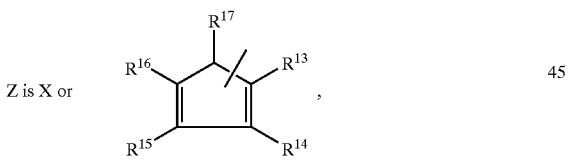, where the radicals $R^{13}$ to $R^{17}$ are hydrogen, $C_1$–$C_{10}$-alkyl, 5- to 7-membered cycloalkyl which in turn may bear $C_1$–$C_{10}$-alkyls as substituents, $C_6$–$C_{15}$-aryl or arylalkyl and two adjacent radicals may together form a saturated or unsaturated cyclic group having from 4 to 15 carbon atoms, or $Si(R^{18})_3$ where $R^{18}$ is $C_1$–$C_{10}$-alkyl, $C_6$–$C_{15}$-aryl or $C_3$–$C_{10}$-cycloalkyl, or the radicals $R^8$ and Z together form a group —$R^{19}$—A— where $R^{19}$ is 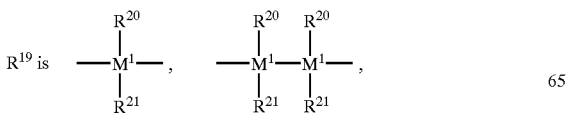

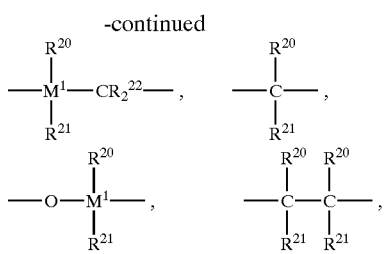

=$BR^{20}$, =$AlR^{20}$, —Ge—, —Sn—, —O—, —S—, =SO, =$SO_2$, =$NR^{20}$, =CO, =$PR^{20}$ or =$P(O)R^{20}$, where $R^{20}$, $R^{21}$ and $R^{22}$ are identical or different and are each a hydrogen atom, a halogen atom, a $C_1$–$C_{10}$-alkyl group, a $C_1$–$C_{10}$-fluoralkyl group, a $C_6$–$C_{10}$-fluoraryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is 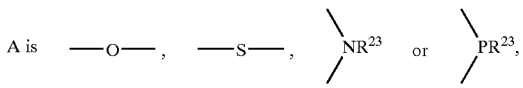

where $R^{23}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{24})_3$, $R^{24}$ is hydrogen, $C_1$–$C_{10}$-alkyl, $C_6$–$C_{15}$-aryl which in turn may bear $C_1$–$C_4$-alkyl groups as substituents or $C_3$–$C_{10}$-cycloalkyl or the radicals $R^8$ and $R^{16}$ together form a group —$R^{19}$—.

Among the metallocene complexes of the formula III, preference is given to

 IIIa

 IIIb

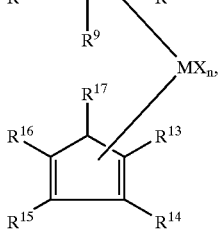

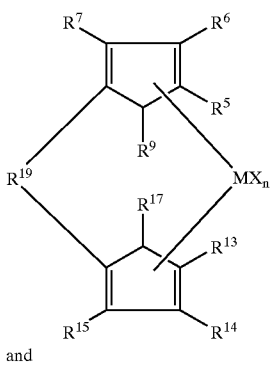

IIIc and

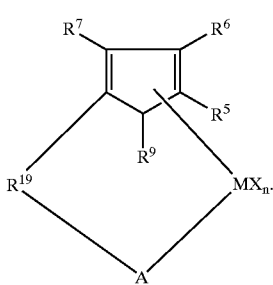

IIId

The radicals X can be identical or different, preferably identical.

Among the compounds of the formula IIIa, particular preference is given to those in which
M is titanium, zirconium or hafnium,
X is chlorine, $C_1$–$C_4$-alkyl or phenyl,
n is 2 and
$R^5$ to $R^9$ are hydrogen or $C_1$–$C_4$-alkyl.

Among the compounds of the formula IIIb, preference is given to those in which
M is titanium, zirconium or hafnium,
X is chlorine, $C_1$–$C_4$-alkyl or phenyl,
n is 2,
$R^5$ to $R^9$ are hydrogen, $C_1$–$C_4$-alkyl or $Si(R^{12})_3$,
$R^{13}$ to $R^{17}$ are hydrogen, $C_1$–$C_4$-alkyl or $Si(R^{18})_3$.

Particularly useful compounds are those of the formula IIIb in which the cyclopentadienyl radicals are identical.

Examples of particularly useful compounds are, inter alia:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and also the corresponding dimethylzirconium compounds.

Particularly useful compounds of the formula IIIc are those in which
$R^5$ and $R^{13}$ are identical and are hydrogen or $C_1$–$C_{10}$-alkyl groups,
$R^9$ and $R^{17}$ are identical and are hydrogen, methyl, ethyl, isopropyl or tert-butyl,
$R^7$ and $R^{15}$ are $C_1$–$C_4$-alkyl and
$R^6$ and $R^{14}$ are hydrogen or
two adjacent radicals $R^6$ and $R^7$ or $R^{14}$ and $R^{15}$ in each case together form a saturated or unsaturated cyclic group having from 4 to 12 carbon atoms,

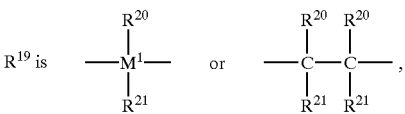

M is titanium, zirconium or hafnium and
X is chlorine, $C_1$–$C_4$-alkyl or phenyl.
Examples of particularly useful complexes are, inter alia:

dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride,
and diphenylsilanediylbis(2-methylindenyl)hafnium dichloride and also the corresponding dimethylzirconium compounds.
Further examples of suitable complexes are, inter alia:

dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methyl-4-isopropylindenyl)zirconium dichloride and
dimethylsilanediylbis(2-methyl-4,6-diisopropylindenyl)zirconium dichloride and also the corresponding dimethylzirconium compounds.

Particularly useful compounds of the formula IIId are those in which

M is titanium or zirconium,

X is chlorine, $C_1$–$C_4$-alkyl or phenyl, $R^{19}$ is 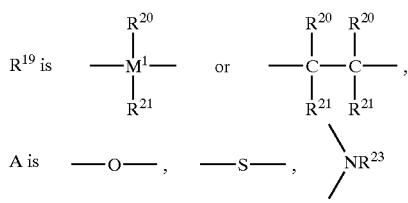

A is —O—, —S—, $\diagdown$NR$^{23}$/ and $R^5$ to $R^7$ and $R^9$ are hydrogen, $C_1$–$C_{10}$-alkyl, $C_3$–$C_{10}$-cycloalkyl, $C_6$–$C_{15}$-aryl or $Si(R^{12})_3$, or two adjacent radicals form a cyclic group having from 4 to 12 carbon atoms.

Such complexes can be synthesized by methods known per se, with preference being given to reacting the appropriately substituted, cyclic hydrocarbon anions with halides of titanium, zirconium, hafnium, vanadium, niobium or tantalum.

Examples of appropriate preparative methods are described, for example, in Journal of Organometallic Chemistry, 369 (1989), 359–370.

It is also possible to use mixtures of various metallocene complexes.

As component C), the catalyst system of the present invention comprises oligomeric aluminum oxide compounds. Examples of suitable aluminum oxide compounds are open-chain or cyclic aluminoxane compounds of the formula IV or V

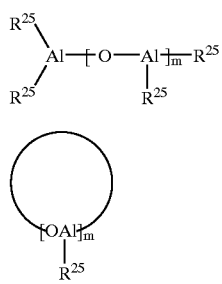

where $R^{25}$ is a $C_1$–$C_4$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

The oligomeric aluminoxane compounds obtained in this way are generally in the form of mixtures of both linear and cyclic chain molecules of various lengths, so that m is to be regarded as a mean value. The aluminoxane compounds can also be present in admixture with other metal alkyls, preferably aluminum alkyls.

Both the metallocene complexes (component B) and the oligomeric aluminum oxide compounds (component C) are preferably used in solution, with particular preference being given to aromatic hydrocarbons having from 6 to 20 carbon atoms, in particular xylenes and toluene.

Furthermore, as component C), it is possible to use aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279, or mixtures thereof in place of the aluminoxane compounds of the formulae IV and V.

It has been found to be advantageous to use the metallocene complexes B) and the oligomeric aluminum oxide compounds in such amounts that the atomic ratio of aluminum from the oligomeric aluminum oxide compounds C) to the transition metal from the metallocene complexes B) is in the range from 10:1 to $10^6$:1, in particular from 10:1 to $10^4$:1.

In addition, the catalyst system of the present invention further comprises, as component D), at least one boron compound of the formula I

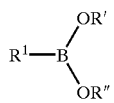

I or a cyclic boron compound of the formula II

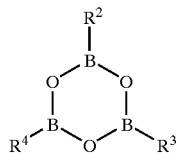

II or mixtures of boron compounds I and II, where, in the formulae I and II, the substituents have the following meanings:

$R^1$ to $R^4$ are each a branched or preferably linear $C_1$–$C_{20}$-alkyl group, in particular a methyl or ethyl group, which may bear, for example, from one to three halogen atoms, in particular fluorine and chlorine, $C_6$–$C_{15}$-aryl groups, preferably phenyl groups, and/or $C_1$–$C_{10}$-alkoxy groups, preferably $C_1$–$C_4$-alkoxy groups, as substituents, a $C_4$–$C_7$-cycloalkyl group, preferably a $C_5$–$C_6$-cycloalkyl group, which may bear, for example, from one to three halogen atoms, in particular fluorine and chlorine, branched or preferably linear $C_1$–$C_{10}$-alkyl groups, preferably $C_1$–$C_4$-alkyl groups and/or branched or preferably linear alkoxy groups having from 1 to 10 carbon atoms, in particular from 1 to 4 carbon atoms, as substituents, a branched or preferably linear alkoxy or alkyl sulfide group having from 1 to 10 carbon atoms, preferably from 1 to 4 carbon atoms, which may bear, for example, from 1 to 3 halogen atoms, in particular fluorine and chlorine, branched or preferably linear $C_1$–$C_{10}$-alkyl groups, preferably $C_1$–$C_4$-alkyl groups and/or $C_6$–$C_{15}$-aryl groups, preferably phenyl groups, as substituents, a $C_6$–$C_{15}$-aryl group, preferably phenyl, which may bear, for example, from one to five halogen atoms, preferably fluorine and chlorine, branched or preferably linear $C_1$–$C_{10}$-alkyl groups, in particular $C_1$–$C_4$-alkyl groups, branched or preferably linear $C_1$–$C_{10}$-alkyl groups, in particular $C_1$–$C_4$-alkyl groups, which may bear, for example, from one to five halogen atoms, preferably fluorine and chlorine, as substituents, branched or preferably linear $C_1$–$C_{10}$-alkyl groups, in particular $C_1$–$C_4$-alkyl groups, which contain, for example, from one to three double bonds, amino groups, amino groups bearing one or two branched or preferably linear $C_1$–$C_{10}$-alkyl groups, in particular $C_1$–$C_4$-alkyl groups, as substituents, nitro groups, formyl groups, acetamido groups and/or branched or preferably linear alkoxy groups having from 1 to 10 carbon atoms, in particular from 1 to 4 carbon atoms, as substituents, or a saturated or unsaturated $C_3$–$C_{15}$-heterocycle which contains from one to three oxygen, sulfur and/or nitrogen atoms in the ring system, preferably furan, thiophene, pyridine, pyrimidine or pyrazine, and may bear, for example, from one to five halogen atoms, in particular fluorine and chlorine, $C_6$–$C_{15}$-aryl groups, preferably phenyl groups, further $C_3$–$C_{15}$-heterocycles containing from one to three oxygen, sulfur and/or nitrogen atoms in the ring system which can in turn be substituted, and/or branched or preferably linear $C_1$–$C_{10}$-alkyl groups, preferably $C_1$–$C_4$-alkyl groups, as substituents, where in each case two alkyl or aryl substituents together with the atoms connecting them can form a saturated or unsaturated ring having from 4 to 15 carbon atoms, furthermore, $R^1$ to $R^4$ are as defined above and additionally bear from one to three further B(OR') (OR") groups, where $R^1$ to $R^4$ are then preferably phenyl or biphenyl, or if $R^1$ to $R^4$ contain an aromatic ring, this is part of a metallocene system, for example a ferrocene system, R' and R" are identical or different and are each hydrogen or a branched or preferably linear $C_1$–$C_{10}$-alkyl group, preferably from 1 to 4 carbon atoms.

Preference is in each case given to the unsubstituted compounds; $R^1$ to $R^4$ are particularly preferably unsubstituted linear $C_1$–$C_4$-alkyl or $C_6$–$C_{10}$-aryl groups.

Among the boron compounds of the formula I, particular preference is given to methylboronic acid, ethylboronic acid and benzeneboronic acid. However, in place of the free acid, it is also possible to use the alkyl esters having from 1 to 10 carbon atoms, in particular from 1 to 4 carbon atoms.

Among the cyclic boron compounds of the formula II, compounds which have been found to be particularly useful are those in which all three radicals $R^2$, $R^3$ and $R^4$ have the same meanings, with particular preference being given to trimethylboroxane, triethylboroxane and triphenylboroxane.

The preparation of cyclic boron compounds of the formula II is known per se to those skilled in the art and can be carried out, for example, by reacting boron oxide with trialkylboranes, as known, for example, from U.S. Pat. No. 5,001,244.

Mixtures of various boron compounds of the formulae I and/or II can likewise be used.

The atomic ratio of boron from the boron compounds D) to the aluminum from the oligomeric aluminum oxide compounds C) can be in the range from $10^{-4}$:1 to 1:1, preferably from $10^{-2}$:1 to 1:1, in particular from 0.05:1 to 0.2:1.

The catalyst system of the present invention can, if desired, further comprise, as additional component E), a metal compound of the formula VI $$M^2(R^{26})_r(R^{27})_s(R^{28})_t \qquad \text{VI}$$

where $M^2$ is an alkali metal, an alkaline earth metal or a metal of main group III of the Periodic Table, i.e. boron, aluminum, gallium, indium or thallium, $R^{26}$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^{27}$ and $R^{28}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of $M^2$.

Among the metal compounds of the formula VI, preference is given to those in which $M^2$ is lithium, magnesium or aluminum and $R^{26}$ to $R^{28}$ are $C_1$–$C_{10}$-alkyl.

Particularly preferred metal compounds of the formula VI are n-butyllithium, n-butyl-n-octylmagnesium, n-butyl-n-heptylmagnesium, tri-n-hexylaluminum, tri-isobutylaluminum, triethylaluminum and trimethylaluminum.

If the component E) is used, it is preferably present in the catalyst system in an amount of from 800:1 to 1:1, in particular from 500:1 to 50:1 (molar ratio of $M^2$ from VI to transition metal M from III).

The components A), B), C), D) and, if desired, E) are used together as the catalyst system of the present invention. Usually, a catalyst solid is first prepared from the components A), B), C) and D) and any component E) used is only added in the polymerization. The order in which the four constituents A), B), C) and D) of the catalyst system of the present invention are combined in the catalyst synthesis is immaterial. The components can be added individually or as a mixture. In a preferred catalyst synthesis, the components A), B) and C) are combined first and only then is D) added, i.e. the boron compounds D) are added to metallocene complexes B) which have already been applied to a support A) and activated with aluminum oxide compounds C).

The catalyst system of the present invention is used for polymerizing or copolymerizing $C_2$–$C_{12}$-alk-1-enes. Preferred $C_2$–$C_{12}$- alk-1-enes are ethylene, propylene, 1-butene, 1-pentene, 4-methylpent-1-ene, 1-hexene, 1-heptene or 1-octene and also vinylaromatic monomers such as styrene, p-methylstyrene or 2,4-dimethylstyrene or mixtures of these. Particular preference is given to homopolymers or copolymers of ethylene or of propylene, where the proportion of ethylene or of propylene in the copolymers is at least 50 mol %. Preferred copolymers of ethylene are those comprising propylene, 1-butene, 1-hexene or 1-octene or mixtures thereof as further monomers. Particularly preferred copolymers of propylene are those comprising ethylene or 1-butene or mixtures thereof as further monomers.

The catalyst system of the present invention is preferably used for preparing polymers which consist of from 50 to 100 mol % of ethylene and from 0 to 50 mol %, in particular from 0 to 30 mol %, of $C_3$–$C_{12}$-alk-1-enes.

Preference is also given to polymers consisting of from 50 to 100 mol % of propylene, from 0 to 50 mol %, in particular from 0 to 30 mol %, of ethylene and from 0 to 20 mol %, in particular from 0 to 10 mol %, of $C_4$–$C_{12}$-alk-1-enes.

The sum of the molar percentages is always 100.

The polymerization can be carried out continuously or batchwise in the processes customary for the polymerization of olefins, for example solution processes, suspension processes, stirred gas-phase processes or gas-phase fluidized-bed processes. Solvents or suspension media which can be used are inert hydrocarbons such as isobutane or else the monomers themselves. Particularly well suited methods of preparing the polymers are the suspension process and the gas-phase processes.

Suitable reactors are, inter alia, continuously operated stirred reactors, loop reactors or fluidized-bed reactors; if desired, it is also possible to use a plurality of reactors connected in series (reactor cascade).

The polymerization with the aid of the catalyst system of the present invention is carried out at from −50 to 300° C., preferably from 0 to 150° C., and at pressures of from 0.5 to 3000 bar, preferably from 1 to 80 bar. In the polymerization process of the present invention, it is advantageous to set the residence times of the respective reaction mixtures to from 0.5 to 5 hours, in particular from 0.7 to 3.5 hours. In the polymerization, use can also be made of, inter alia, antistatics and molar mass regulators, for example hydrogen.

The catalyst systems of the present invention have a high productivity and cause neither deposits nor lumps in the reactor during the polymerization. In addition, the polymers prepared in this way have an excellent morphology.

The resulting polymers or copolymers of $C_2$–$C_{12}$-alk-1-enes have low aluminum and chlorine contents. They are suitable, in particular, for producing fibers, films and moldings.

EXAMPLES

All catalysts syntheses were carried out with exclusion of air and moisture under an inert gas atmosphere.

The determination of η was carried out in accordance with ISO 1628-3.

The density was determined in accordance with DIN ISO 1183.

Catalyst Syntheses (Examples 1 to 5 and Comparative Example A)

Example 1

A 500 ml four-neck flask was charged with 213.3 ml of MAO (1.53 M solution in heptane, from Witco). After addition of 3.41 g of triphenylboroxane, the mixture was stirred for 30 minutes. 0.33 g of bis(n-butylcyclopentadienyl)zirconium dichloride was subsequently added thereto and the reaction solution was stirred for 15 minutes. 32.4 g of silica gel (ES 70 X, from Crosfield) were added. The catalyst suspension was stirred for 30 minutes and then filtered. The residue was washed with 2×250 ml of heptane and then dried under reduced pressure. Yield: 48.8 g.

Example 2

A 500 ml four-neck flask was charged with 226.5 ml of MAO (1.53 M solution in heptane, from Witco) and 0.35 g of bis(n-butylcyclopentadienyl)zirconium dichloride and the mixture was stirred for 15 minutes. After addition of 3.61 g of triphenylboroxane, the reaction mixture was stirred for 30 minutes. 34.7 g of silica gel (ES 70 X, from Crosfield) were subsequently added. The catalyst suspension was stirred for 30 minutes and then filtered. The residue was washed with 2×250 ml of heptane and then dried under reduced pressure. Yield: 49.4 g.

Example 3

A 500 ml four-neck flask was charged with 194.4 ml of MAO (1.53 M solution in heptane, from Witco) and 0.30 g of bis(n-butylcyclopentadienyl)zirconium dichloride and the mixture was stirred for 15 minutes. 29.6 g of silica gel (ES 70 X, from Crosfield) were subsequently added and the reaction mixture was stirred for 30 minutes. 3.1 g of triphenylboroxane were added. The catalyst suspension was stirred for 30 minutes and then filtered. The residue was washed with 2×250 ml of heptane and then dried under reduced pressure. Yield: 40.4 g.

Example 4

A 500 ml four-neck flask was charged with 222.1 ml of MAO (1.53 M solution in heptane, from Witco) and 0.34 g of bis(n-butylcyclopentadienyl)zirconium dichloride and the mixture was stirred for 15 minutes. 26.3 g of silica gel (ES 70 X, from Crosfield) were subsequently added and the reaction mixture was stirred for 30 minutes. 1.58 ml (1.42 g) of trimethylboroxane were added. The catalyst suspension was stirred for 30 minutes and then filtered. The residue was washed with 2×250 ml of heptane and then dried under reduced pressure. Yield: 32.5 g.

Example 5

A 500 ml four-neck flask was charged with 172.5 ml of MAO (1.53 M solution in heptane, from Witco) and 0.27 g of bis(n-butylcyclopentadienyl)zirconium dichloride and the mixture was stirred for 15 minutes. 34.0 g of silica gel (ES 70 X, from Crosfield) were subsequently added and the reaction mixture was stirred for 30 minutes. 3.2 g of benzeneboronic acid were added. The catalyst suspension was stirred for 30 minutes and then filtered. The residue was washed with 2×250 ml of heptane and then dried under reduced pressure. Yield: 43.2 g.

Comparative Example A

A catalyst was prepared without the addition of boron compound D). For this purpose, a 500 ml four-neck flask was charged with 129.4 ml of MAO (1.53 M solution in heptane, from Witco) and 0.20 g of bis(n-butylcyclopentadienyl)zirconium dichloride and the mixture was stirred for 15 minutes. 25.5 g of silica gel (ES 70 X, from Crosfield) were subsequently added. The catalyst suspension was stirred for 30 minutes and then filtered. The residue was washed with 2×250 ml of heptane and then dried under reduced pressure. Yield: 30.1 g.

Polymerization (Examples 6 to 12 and Comparative Examples B and C)

Examples 6 to 12

After a stirred 10 l steel autoclave had been flushed carefully with nitrogen and heated to the polymerization temperature of 70° C., it was charged with 4.5 l of isobutane, 80 mg of n-butyl-lithium and, in the case of the copolymerization, 400 ml of butene. The amount indicated in the following table of a supported catalyst prepared in one of Examples 1 to 5 was then rinsed in with a further 0.5 l of isobutane and the autoclave was pressurized with ethylene to a total pressure of 38 bar. The pressure in the autoclave was kept constant by metering in further amounts of ethylene. After 90 minutes, the polymerization was stopped by venting the autoclave. In each case, the amount of polymer indicated in the following table was obtained in the form of a free-flowing powder. The analytical data are likewise shown in the following table.

Comparative Examples B and C

The polymerization was carried out using a method similar to Examples 6 to 12, but the supported catalyst prepared in Comparative Example A was used. The amounts of catalyst used and the analytical data are likewise shown in the following table.

TABLE

| Example or Comparative Example | Catalyst from Example or Comparative Example | Co-monomer | Amount of Catalyst used [mg] | Polymer [g] | Productivity [g of polymer/ g of catalyst] | η [dl/g] | Density [g/cm³] |
| --- | --- | --- | --- | --- | --- | --- | --- |
| 6 | 1 | — | 230 | 2050 | 8900 | 3.33 | — |
| 7 | 2 | — | 252 | 2340 | 9300 | 3.36 | — |
| 8 | 3 | — | 123 | 1190 | 9700 | 3.75 | — |
| 9 | 3 | Butene | 135 | 1370 | 10150 | 2.15 | 0.931 |
| 10 | 4 | — | 214 | 2070 | 9700 | 3.39 | — |
| 11 | 5 | — | 153 | 1500 | 9800 | 3.48 | — |
| 12 | 5 | Butene | 174 | 1869 | 10700 | 1.83 | 0.930 |
| B | A | — | 490 | 1900 | 3900 | 3.73 | — |
| C | A | Butene | 394 | 1870 | 4800 | 2.07 | 0.931 |

It can be seen from the table that, inter alia, significantly higher productivities are achieved in the Examples 6 to 12 according to the present invention using the catalysts from Examples 1 to 5 prepared according to the present invention than in the Comparative Examples B and C in which the catalyst synthesized in Comparative Example A was used. In particular the good productivities are achieved (Examples 8–12) when, in the catalyst synthesis, the boron compound D) is added to a metallocene complex B) which has already been applied to a support A) and activated with aluminum oxide compounds C) as in Examples 3 to 5.

The table also shows that the use according to the present invention of the boron compounds D) reduces the molar mass of the polymer formed only very little or not at all. (η does not decrease or decreases only slightly).

What is claimed is:

1. A catalyst system for polymerizing $C_2$–$C_{12}$-alk-1-enes comprising

A) an organic or inorganic support,

B) at least one metallocene complex,

C) oligomeric aluminum oxide compounds and

D) at least one boron compound of the formula I

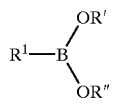

I or a cyclic boron compound of the formula II

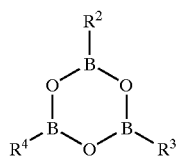

II or mixtures of boron compounds I and II, where, in the formulae I and II, the substituents have the following meanings:

$R^1$ to $R^4$ are each a $C_1$–$C_{20}$-alkyl group which may bear halogen atoms, $C_6$–$C_{15}$-aryl groups and/or $C_1$–$C_{10}$-alkoxy groups as substituents, a $C_4$–$C_7$-cycloalkyl group which may bear halogen atoms, $C_1$–$C_{10}$-alkyl groups and/or $C_1$–$C_{10}$-alkoxy groups as substituents, a $C_1$–$C_{10}$-alkoxy or alkyl sulfide group which may bear halogen atoms, $C_1$–$C_{10}$-alkyl groups and/or $C_6$–$C_{15}$-aryl groups as substituents, a $C_6$–$C_{15}$-aryl group which may bear halogen atoms, $C_1$–$C_{10}$-alkyl groups, $C_1$–$C_{10}$-haloalkyl groups, $C_4$–$C_{10}$-cycloalkyl groups, $C_6$–$C_{15}$-aryl groups, $C_1$–$C_{10}$-alkenyl groups, amino groups, monoalkylamino or dialkylamino groups, nitro groups, formyl groups, acetamido groups and/or $C_1$–$C_{10}$-alkoxy groups as substituents or a saturated or unsaturated $C_3$–$C_{15}$-heterocycle which contains from one to three oxygen, sulfur and/or nitrogen atoms in the ring system and may bear halogen atoms, $C_6$–$C_{15}$-aryl groups, further $C_3$–$C_{15}$-heterocycles and/or $C_1$–$C_{10}$-alkyl groups as substituents, furthermore, $R^1$ to $R^4$ are as defined above and additionally bear from one to three further B(OR')(OR") groups or, if $R^1$ to $R^4$ contain an aromatic ring, this is part of a metallocene system, R' and R" are identical or different and are each hydrogen or a $C_1$–$C_{10}$-alkyl group, prepared by a process wherein the components A), B) and C), are first combined and secondly, the boron compound(s) of the formula I or II or a mixture of I or II are added.

2. A catalyst system as claimed in claim 1, wherein the support A) is an oxide of silicon, of aluminium, of titanium or an oxide of a metal of main group I or II of the Periodic Table.

3. A catalyst system as claimed in claim 2, wherein the support A) is silica gel ($SiO_2$).

4. A catalyst system as claimed in claim 1, wherein the metallocene complex B) is a metallocene complex of the formula III

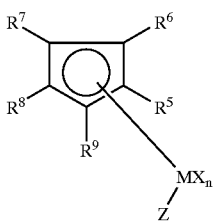

(III)

where the substituents have the following meanings:

M is titanium, zirconium, hafnium, vanadium, niobium or tantalum, or an element of transition group III of the Periodic Table or the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{10}$ or —$NR^{10}R^{11}$, n is 1, 2 or 3, where n corresponds to the valence of M minus 2, where $R^{10}$ and $R^{11}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^5$ to $R^9$ are hydrogen, $C_1$–$C_{10}$-alkyl, 5- to 7-membered cycloalkyl which in turn may bear $C_1$–$C_{10}$-alkyls as substituents, $C_6$–$C_{15}$-aryl or arylalkyl, where two adjacent radicals may also together form a saturated or unsaturated cyclic group having from 4 to 15 carbon atoms, or $Si(R^{12})_3$ where $R^{12}$ can be $C_1$–$C_{10}$-alkyl, $C_3$–$C_{10}$-cycloalkyl or $C_6$–$C_{15}$-aryl and Z is X or 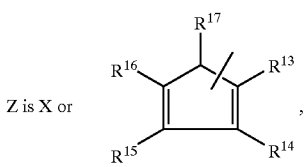, where the radicals $R^{13}$ to $R^{17}$ are hydrogen, $C_1$–$C_{10}$-alkyl, 5- to 7-membered cycloalkyl which in turn may bear $C_1$–$C_{10}$-alkyls as substituents, $C_6$–$C_{15}$-aryl or arylalkyl and two adjacent radicals may together form a saturated or unsaturated cyclic group having from 4 to 15 carbon atoms, or $Si(R^{18})_3$ where $R^{18}$ is $C_1$–$C_{10}$-alkyl, $C_6$–$C_{15}$-aryl or $C_3$–$C_{10}$-cycloalkyl, or the radicals $R^8$ and Z together form a group —$R^{19}$—A— where $R^{19}$ is 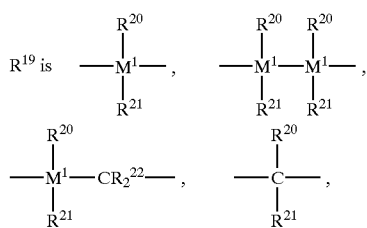

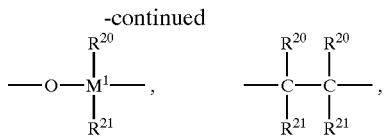

=$BR^{20}$, =$AlR^{20}$, —Ge—, —Sn—, —O—, —S—, =SO, =$SO_2$, =$NR^{20}$, =CO, =$PR^{20}$ or =$P(O)R^{20}$, where $R^{20}$, $R^{21}$ and $R^{22}$ are identical or different and are each a hydrogen atom, a halogen atom, a $C_1$–$C_{10}$-alkyl group, a $C_1$–$C_{10}$-fluoroalkyl group, a $C_8$–$C_{10}$-flouraryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and $M^1$ is silicon, germanium or tin, A is 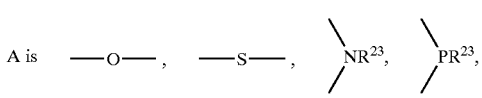

where $R^{23}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{24})_3$, $R^{24}$ is hydrogen, $C_1$–$C_{10}$-alkyl, $C_6$–$C_{15}$-aryl which in turn may bear $C_1$–$C_4$-alkyl groups as substituents or $C_3$–$C_{10}$-cycloalkyl or the radicals $R^8$ and $R^{16}$ together form a group —$R^{19}$—, and the oligomeric aluminium oxide compounds C) are open- chain or cyclic aluminoxane compounds of the formula IV or V,

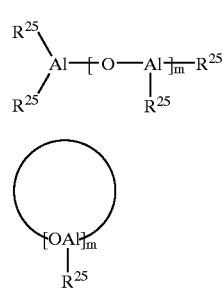

(IV)

(V)

where $R^{25}$ is a $C_1$–$C_4$-alkyl group and m is an integer from 5 to 30.

5. A catalyst system as claimed in claim 1, wherein the atomic ratio of aluminum from the oligomeric aluminum oxide compounds C) to the metal of transition group IV or V of the Periodic Table from the metallocene complex B) is in the range from 10:1 to $10^6$:1.

6. A catalyst system as claimed in claim 1, wherein the atomic ratio of boron from the boron compound(s) D) to the aluminum from the oligomeric aluminum oxide compounds C) is in the range from $10^{-4}$:1 to 1:1.

7. A catalyst system as claimed in claim 1 which further comprises, as additional component E), a metal compound of the formula VI

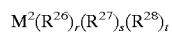      VI where

M² is an alkali metal, an alkaline earth metal or a metal of main group III of the Periodic Table, i.e. boron, aluminium, gallium, indium or thallium, $R^{26}$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^{27}$ and $R^{28}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of M².

8. A process for preparing catalyst systems for polymerizing $C_2$–$C_{12}$-alk-1-enes comprising A) an organic or inorganic support, B) at least one metallocene complex, C) oligomeric aluminum oxide compounds and D) at least one boron compound of the formula I

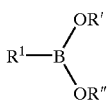

or a cyclic boron compound of the formula II

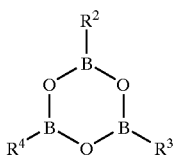

or mixtures of boron compounds I and II, where, in the formulae I and II, the substituents have the following meanings:

$R^1$ to $R^4$ are each a $C_1$–$C_{20}$-alkyl group which may bear halogen atoms, $C_6$–$C_{15}$-aryl groups and/or $C_1$–$C_{10}$-alkoxy groups as substituents, a $C_4$–$C_7$-cycloalkyl group which may bear halogen atoms, $C_1$–$C_{10}$-alkyl groups and/or $C_1$–$C_{10}$-alkoxy groups as substituents, a $C_1$–$C_{10}$-alkoxy or alkyl sulfide group which may bear halogen atoms, $C_1$–$C_{10}$-alkyl groups and/or $C_6$–$C_{15}$-aryl groups as substituents, a $C_6$–$C_{15}$-aryl group which may bear halogen atoms, $C_1$–$C_{10}$-alkyl groups, $C_1$–$C_{10}$-haloalkyl groups, $C_4$–$C_{10}$-cycloalkyl groups, $C_6$–$C_{15}$-aryl groups, $C_1$–$C_{10}$-alkenyl groups, amino groups, monoalkylamino or dialkylamino groups, nitro groups, formyl groups, acetamido groups and/or $C_1$–$C_{10}$-alkoxy groups as substituents or a saturated or unsaturated $C_3$–$C_{15}$-heterocycle which contains from one to three oxygen, sulfur and/or nitrogen atoms in the ring system and may bear halogen atoms, $C_6$–$C_{15}$-aryl groups, further $C_3$–$C_{15}$-heterocycles and/or $C_1$–$C_{10}$-alkyl groups as substituents, furthermore, $R^1$ to $R^4$ are as defined above and additionally bear from one to three further B(OR')(OR") groups or, if $R^1$ to $R^4$ contain an aromatic ring, this is part of a metallocene system, R' and R" are identical or different and are each hydrogen or a $C_1$–$C_{10}$-alkyl group, prepared by a process wherein the components A), B) and C), are first combined and secondly, the boron compound(s) of the formula I or II or a mixture of I or II are added.

9. A process for preparing polymers or copolymers of $C_2$–$C_{12}$-alk-1-enes, wherein $C_2$–$C_{12}$-alk-1-enes are contacted with a catalyst system prepared by the process of claim 8.

10. A process for preparing polymers or copolymers of $C_2$–$C_{12}$-alk-1-enes at from −50 to +300° C. and pressures of from 0.5 to 3000 bar with the aid of a catalyst system prepared by the process of claim 8.

11. A process as claimed in claim 10, wherein the polymerization is carried out in suspension or in the gas phase.

12. A process as claimed in claim 10, wherein ethylene is used as $C_2$–$C_{12}$-alk-1-ene in such an amount that the resulting polymer contains at least 50 mol % of ethylene.

13. A process as claimed in claim 10, wherein propylene is used as $C_2$–$C_{12}$-alk-l-ene in such an amount that the resulting polymer contains at least 50 mol % of propylene.

14. process as claimed in claim 8, wherein the support A) is an oxide of silicon, of aluminum, of titanium or an oxide of a metal of main group I or II of the Periodic Table.

15. A process as claimed in claim 14, wherein the support A) is silica gel ($SiO_2$).

16. A process as claimed in claim 8, wherein the metallocene complex B) is a metallocene complex of the formula III

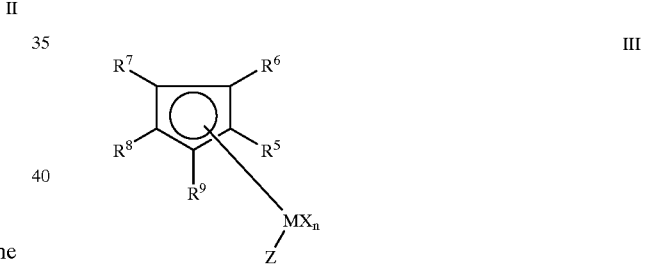

where the substituents have the following meanings:

M is titanium, zirconium, hafnium, vanadium, niobium or tantalum, or an element of transition group III of the Periodic Table or the lanthanides, X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{10}$ or —$NR^{10}R^{11}$, n is 1, 2 or 3, where n corresponds to the valence of M minus 2, where $R^{10}$ and $R^{11}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^5$ to $R^9$ are hydrogen, $C_1$–$C_{10}$-alkyl, 5- to 7-membered cycloalkyl which in turn may bear $C_1$–$C_{10}$-alkyls as substituents, $C_6$–$C_{15}$-aryl or arylalkyl, where two adjacent radicals may also together form a saturated or unsaturated cyclic group having from 4 to 15 carbon atoms, or Si($R^{12}$)$_3$ where $R^{12}$ can be $C_1$–$C_{10}$-alkyl, $C_3$–$C_{10}$-cycloalkyl or $C_6$–$C_{15}$-aryl and Z is X or 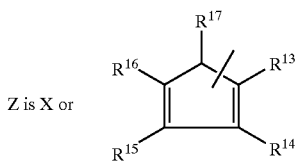

where the radicals
$R^{13}$ to $R^{17}$ are hydrogen, $C_1$–$C_{10}$-alkyl, 5- to 7-membered cycloalkyl which in turn may bear $C_1$–$C_{10}$-alkyls as substituents, $C_6$–$C_{15}$-aryl or arylalkyl and two adjacent radicals may together form a saturated or unsaturated cyclic group having from 4 to 15 carbon atoms, or $Si(R^{18})_3$ where
$R^{18}$ is $C_1$–$C_{10}$-alkyl, $C_6$–$C_{15}$-aryl or $C_3$–$C_{10}$-cycloalkyl, or the radicals $R^8$ and Z together form a group —$R^{19}$— A— where $R^{19}$ is 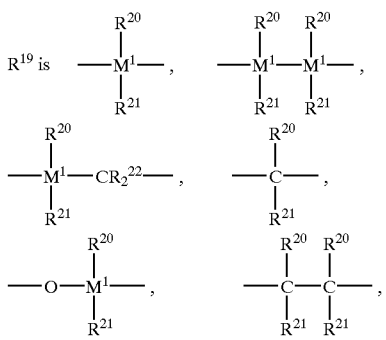

=$BR^{20}$, =$AlR^{20}$, —Ge—, —Sn—, —O—, —S—, =SO, =$SO_2$, =$NR^{20}$, =CO, =$PR^{20}$ or =$P(O)R^{20}$,
where
$R^{20}$, $R^{21}$ and $R^{22}$ are identical or different and are each a hydrogen atom, a halogen atom, a $C_1$–$C_{10}$-alkyl group, a $C_1$–$C_{10}$-fluoralkyl group, a $C_6$–$C_{10}$-fluoraryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a saturated or unsaturated ring having from 4 to 15 carbon atoms, and
$M^1$ is silicon, germanium or tin, A is 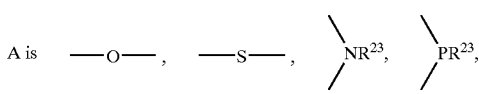

where
$R^{23}$ is $C_1$–$C_{10}$-alkyl, $C_6$–$C_{15}$-aryl, $C_3$–$C_{10}$-cycloalkyl, $C_7$–$C_{18}$-alkylaryl or $Si(R^{24})_3$, $R^{24}$ is hydrogen, $C_1$–$C_{10}$-alkyl, $C_6$–$C_{15}$-aryl which in turn may bear $C_1$–$C_4$-alkyl groups as substituents or $C_3$–$C_{10}$-cycloalkyl
or the radicals $R^8$ and $R^{16}$ together form a group —$R^{19}$—,
and the oligomeric aluminum oxide compounds C) are open-chain or cyclic aluminoxane compounds of the formula IV or V,

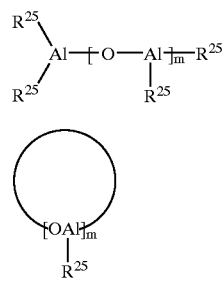

where
$R^{25}$ is a $C_1$–$C_4$-alkyl group and m is an integer from 5 to 30.

17. A process as claimed in claim 8, wherein the atomic ratio of aluminum from the oligomeric aluminum oxide compounds C) to the metal of transition group IV or V of the Periodic Table from the metallocene complex B) is in the range from 10:1 to $10^6$:1.

18. A process as claimed in claim 8, wherein the atomic ratio of boron from the boron compound(s) D) to the aluminum from the oligomeric aluminum oxide compounds C) is in the range from $10^{-4}$:1 to 1:1.

19. A process as claimed in claim 8 which further comprises, as additional component E), a metal compound of the formula VI $$M^2(R^{26})_r(R^{27})_s(R^{28})_t \qquad \text{VI}$$

where
$M^2$ is an alkali metal, an alkaline earth metal or a metal of main group III of the Periodic Table, i.e. boron, aluminum, gallium, indium or thallium,
$R^{26}$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical,
$R^{27}$ and $R^{28}$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical,
r is an integer from 1 to 3
and
s and t are integers from 0 to 2, where the sum r+s+t corresponds to the valence of $M^2$.

* * * * *

UNITED STATES PATENT AND TRADEMARK OFFICE
CERTIFICATE OF CORRECTION

PATENT NO.    : 6,444,764 B1
DATED         : September 3, 2002
INVENTOR(S)   : Kristen et al.

It is certified that error appears in the above-identified patent and that said Letters Patent is hereby corrected as shown below:

Column 14,
Line 30, "$C_6$-$C_{,5}$-" should be -- $C_6$-$C_{15}$- --.

Column 16,
Line 13, "$C_8$-$C_{10}$-" should be -- $C_6$-$C_{10}$- --.

Signed and Sealed this

Twenty-fourth Day of December, 2002

JAMES E. ROGAN
*Director of the United States Patent and Trademark Office*